United States Patent
Hsiao

(10) Patent No.: US 8,215,840 B2
(45) Date of Patent: Jul. 10, 2012

(54) SELF-LUBRICATING MECHANISM OF SLIDE MEMBER

(75) Inventor: Shun-Hsing Hsiao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 442 days.

(21) Appl. No.: 12/612,100

(22) Filed: Nov. 4, 2009

(65) Prior Publication Data

US 2011/0103723 A1    May 5, 2011

(51) Int. Cl.
*F16C 33/10* (2006.01)
*F16C 29/04* (2006.01)

(52) U.S. Cl. .................. 384/13; 384/43; 184/5

(58) Field of Classification Search .............. 384/13, 384/43, 44, 45; 184/5, 13.1; 74/89.44
See application file for complete search history.

(56) References Cited

U.S. PATENT DOCUMENTS

| | | | |
|---|---|---|---|
| 7,066,648 B2 * | 6/2006 | Edelmann et al. | 384/13 |
| 7,543,684 B2 * | 6/2009 | Chin-Pei et al. | 184/5 |
| 2005/0201644 A1 * | 9/2005 | Lee et al. | 384/13 |

* cited by examiner

*Primary Examiner* — James Pilkington
(74) *Attorney, Agent, or Firm* — Guice Patents PLLC

(57) ABSTRACT

A self-lubricating mechanism of slide member, including a slide assembly and a lubricating section. The slide assembly has a linear guide section, a slider linearly slidably mounted on the guide section and reciprocally movable between a first position and a second position and at least one rolling section positioned in a space defined between the slider and the guide section. The lubricating section has a main body fixedly disposed on one side of the slider. The main body is formed with an internal oil reservoir and at least one passage in communication with the oil reservoir. The passage has an opening formed on a first side of the main body in communication with the space. A push body is retractably disposed on the main body. A stopper body is fixed in a position adjacent to the first position for retracting the push body to drive the oil into the space.

8 Claims, 5 Drawing Sheets

SELF-LUBRICATING MECHANISM OF SLIDE MEMBER

BACKGROUND OF THE INVENTION

The present invention relates generally to a linear motor, and more particularly to a self-lubricating mechanism of slide member.

FIG. 1 shows a conventional linear motor 1 having a mover 2 and a stator 3. The mover 2 is linearly reciprocally movable by means of the magnetic field effect between the mover 2 and the stator 3. The mover 2 is guided with linear guide rails 4 for controlling the linear track of the mover 2 and stabilizing the motion of the mover 2. The mover 2 is carried by sliders 5 slidably mounted on the slide rails 4, whereby the guide rails 4 can guide the mover 2 to reciprocally move.

To speak more specifically, ball bodies or rollers are held between the sliders 5 and the slide rails 4 to reduce frictional force so as to stabilize and smoothen the relative sliding motion of the sliders 5 along the slide rails 4. However, considerably great frictional force still exists between the ball bodies and the faces in contact with the ball bodies. Therefore, it is still necessary to lubricate the guide members.

FIG. 2 shows a conventional self-lubricating mechanism for lubricating the guide members. An oil reservoir 6 is connected with one side of the slider 5 for containing lubricating oil. The oil reservoir 6 has woolen felts 7 to provide capillary effect for feeding the lubricating oil reserved in the oil reservoir 6 between the ball bodies and the faces in contact therewith. In normal use environment, such mechanism is able to achieve a certain lubricating effect. However, in a vacuum operation environment, the lubricating oil will have very high viscosity so that the capillary effect will be unapparent. Therefore, the guide members can be hardly lubricated with such self-lubricating mechanism in the vacuum operation environment. However, most of the production equipments for the current high-precision semiconductor products or plane displays require vacuum environment.

FIG. 3 shows a conventional pump-pressurized lubricating mechanism. By means of an external pressurizing pump 8, the lubricating oil is pumped into the slider 5 through an oil tube 9. The lubricating oil is then filled between the ball bodies and the faces in contact therewith. When using a linear motor in a vacuum operation environment, such mechanism is able to achieve the purpose of lubrication. However, in the vacuum environment, there is no medium so that the heat generated by the pressurizing pump 8 cannot be dissipated via air. Moreover, the pressurizing pump 8 is an additional component with respect to the linear motor, which will occupy much room and lead to increment of load. Accordingly, the pump-pressurized lubricating mechanism is not an optimal lubricating measure for the linear motor.

SUMMARY OF THE INVENTION

It is therefore a primary object of the present invention to provide a self-lubricating mechanism of slide member, which is applicable, but not limited to, a linear motor operated in a vacuum environment.

It is a further object of the present invention to provide the above self-lubricating mechanism, which has simplified components and is drivable by means of the linear motor's own power without using any additional power supply unit. Therefore, the self-lubricating mechanism has minified volume and reduced weight and can be manufactured at lower cost.

It is still a further object of the present invention to provide the above self-lubricating mechanism, which can perform lubrication operation in a vacuum chamber. Therefore, it is unnecessary to open the vacuum chamber and restore the environment to the atmospheric state for performing lubricating operation. Accordingly, it is unnecessary to re-vacuumize the chamber so that the energy will not be wasted. Also, the lifetime of the equipments in the vacuum chamber can be prolonged and the maintenance of the equipments is facilitated. Moreover, it is unnecessary to interrupt the operation of the equipments so that the time will not be wasted.

To achieve the above and other objects, the self-lubricating mechanism of the slide member of the present invention includes: a slide assembly including a linear guide section and a slider slidably mounted on the guide section and linearly reciprocally movable along the guide section between a first position and a second position, the slide assembly further including at least one rolling section held between the slider and the guide section and received in a space defined between the slider and the guide section; and a lubricating section having a main body fixedly disposed at one end of the slider, the main body having a first side and a second side, the first side of the main body being connected with the end of the slider, an oil reservoir being formed in the main body for containing a lubricating oil therein, the self-lubricating mechanism being characterized in that the lubricating section further has: at least one passage formed in the main body in communication with the oil reservoir, the passage having an opening on the first side of the main body in communication with the space in which the rolling section is received; a push body slidably disposed on the main body, a first end of the push body extending into the oil reservoir, a second end of the push body outward extending from the second side of the main body; and a stopper body fixedly disposed in a position adjacent to the first position and distal from the second position, one side of the stopper body correspondingly facing the second end of the push body, whereby when the slider is displaced to the first position, the second end of the push body abuts against the side of the stopper body, when lubrication is required, the slider being further moved in a direction away from the second position through a predetermined distance, whereby the push body is stopped by the stopper body and slid relative to the main body, the push body then driving the lubricating oil contained in the oil reservoir out of the opening of the passage to fill the lubricating oil into the space in which the rolling section is received, whereby the rolling section and faces in contact therewith are lubricated with the lubricating oil.

The present invention can be best understood through the following description and accompanying drawings.

DETAILED DESCRIPTION OF THE PREFERRED EMBODIMENTS

Figure 1:
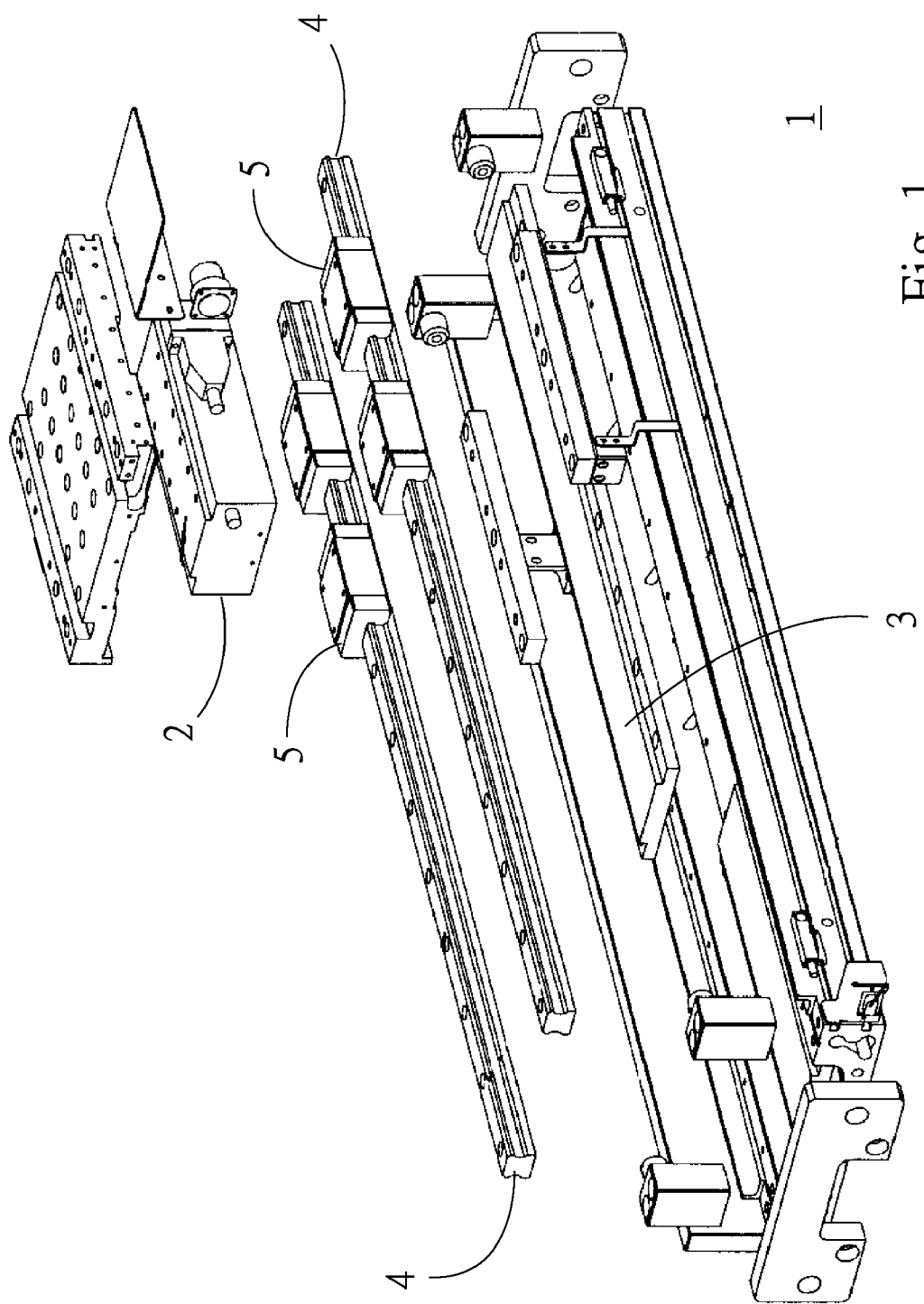
FIG. 1 is a perspective exploded view of a conventional linear motor.
Figure 2:
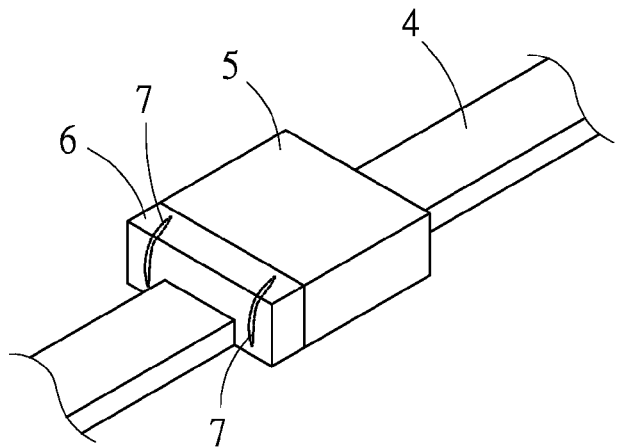
FIG. 2 is a perspective view of a conventional self-lubricating mechanism.
Figure 3:
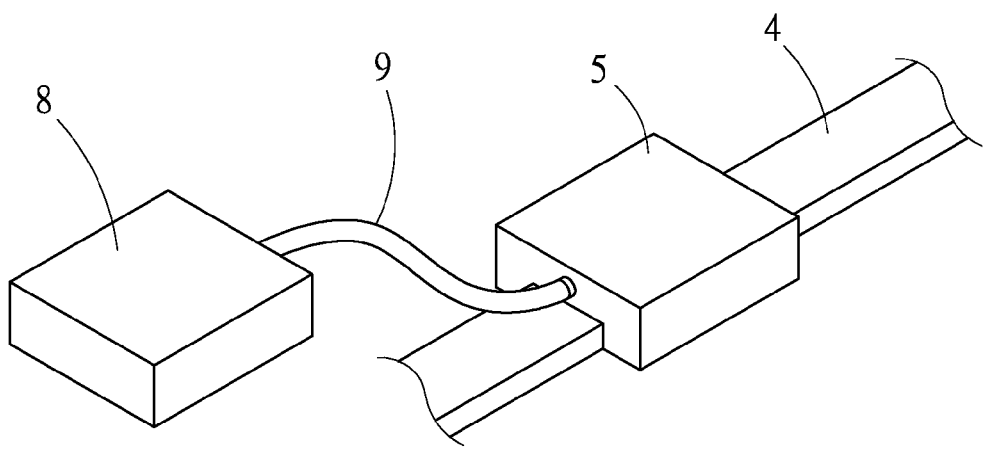
FIG. 3 is a perspective view of a conventional pump-pressurized lubricating mechanism.
Figure 4:
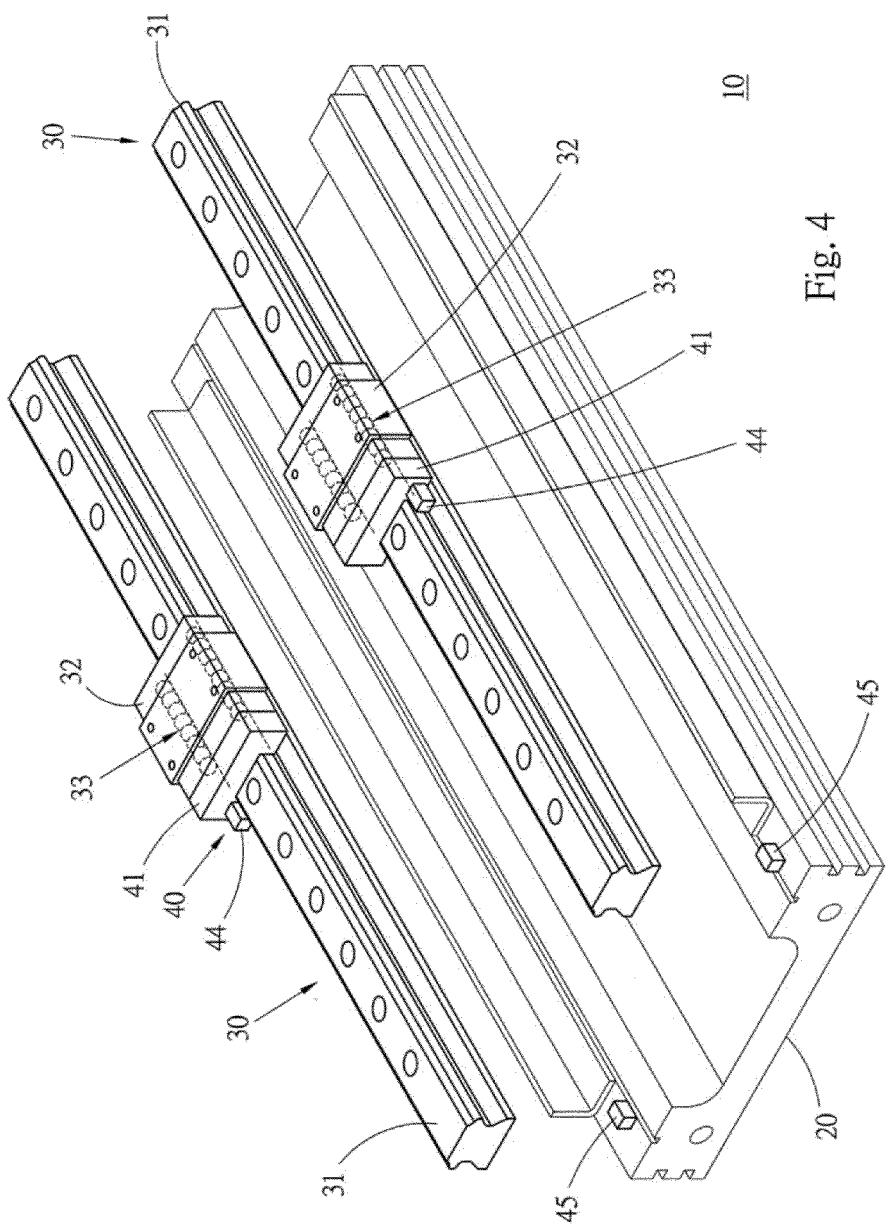
FIG. 4 is a perspective assembled view of a preferred embodiment of the present invention.
Figure 5:
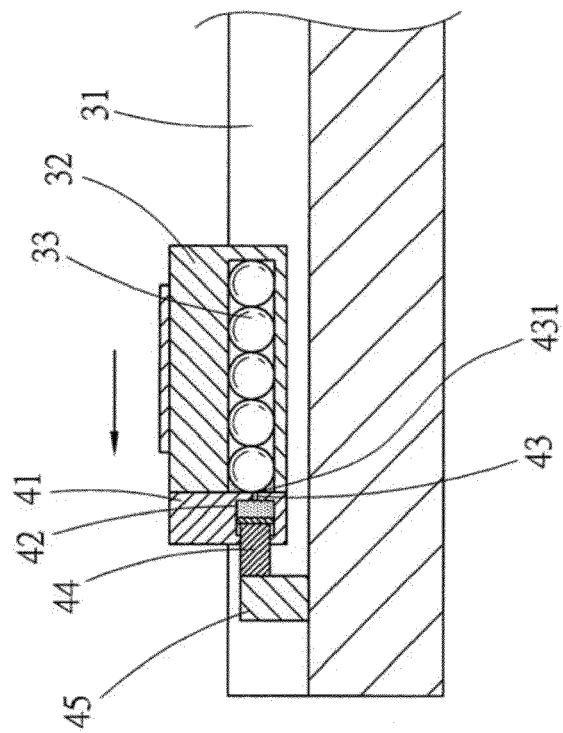
FIG. 5 is a partially sectional view of the preferred embodiment of the present invention, showing that the slider is positioned in the first position.
Figure 6:
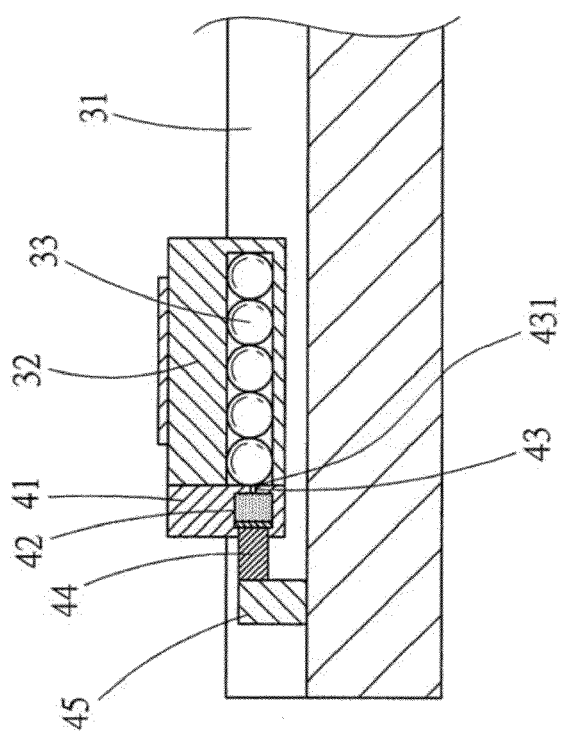
FIG. 6 is a partially sectional view of the preferred embodiment of the present invention, showing that the slider is further displaced in a direction away from the second position by a certain distance.
Figure 7:
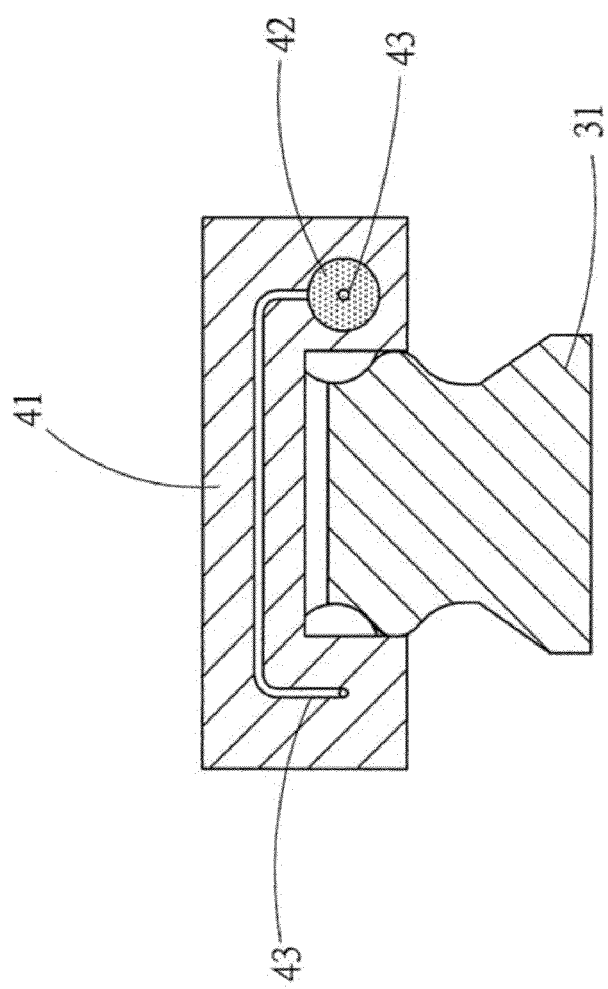
FIG. 7 is a cross-sectional view of the preferred embodiment of the present invention.

Please refer to FIGS. 4 to 7. According to a preferred embodiment, the self-lubricating mechanism 10 of slide member of the present invention includes a base seat 20, two slide assemblies 30 and two lubricating sections 40.

The base seat 20 serves as a base for arranging components of a linear motor. The stator and the mover of the linear motor are mounted on the base seat 20. This pertains to prior art and thus will not be further described hereinafter.

The slide assemblies 30 are for carrying the mover of the linear motor. In general, the linear motor includes a pair of slide assemblies 30 and the mover is mounted between the slide assemblies 30 by means of a mover seat. In this embodiment, there are two slide assemblies 30 for illustration purposes. Substantially, each slide assembly 30 includes a linear guide section 31 with a certain length. The guide sections 31 of the slide assemblies 30 are fixedly disposed on the base seat 20 in parallel to each other. Each slide assembly 30 further includes a substantially U-shaped slider 32 having a recess on one side. The slider 32 is slidably mounted on the guide section 31 with the guide section 31 inlaid in the recess of the slider 32. The slider 32 is linearly reciprocally movable along the guide section 31 between a first position and a second position. Each slide assembly 30 further includes two rolling sections respectively held between two opposite sides of the guide section 31 and corresponding inner faces of the slider 32 and received in the spaces defined between the opposite sides of the guide section 31 and the corresponding inner faces of the slider 32. Each rolling section 33 is composed of multiple ball bodies for smoothening the sliding motion of the slider 32 along the guide section 31. This also pertains to prior art.

The lubricating sections 40 serve to lubricate the slider 32. Each lubricating section 40 has a main body 41 having a first side and a second side opposite to the first side. The first side of the main body 41 is fixedly connected with one end of the slider 32, which end is directed to the first position. An oil reservoir 42 is formed in the main body 41 for containing lubricating oil therein. The main body 41 is further formed with two passages 43 in communication with the oil reservoir 42. Each passage 43 has an opening 431 on the first side of the main body 41 in communication with the spaces in which the rolling sections 33 are received. A rod-shaped push body 44 is disposed on the main body 41 and linearly slidable in a direction parallel to the guide section 31. A first end of the push body 44 extends into the oil reservoir 42 and has a cross-sectional shape complementary to that of the oil reservoir 42. A second end of the push body 44 outward extends from the second side of the main body 41 opposite to the first side thereof. A stopper body 45 is fixedly disposed on the base seat 20 and arranged in a position adjacent to the first position and distal from the second position. The stopper body 45 intersects an extension line of sliding direction of the push body 44. One side of the stopper body 45 correspondingly faces the second end of the push body 44 for retracting the push body 44 into the main body 41 to drive the lubricating oil into the spaces in which the rolling sections 33 are received.

The self-lubricating mechanism 10 of the slide member serves as a component of a linear motor. When lubrication is required, the slider 32 is displaced to the first position by means of the linear motor's own power. At this time, the second end of the push body 44 abuts against the side of the stopper body 45. When the slider 32 is further moved in a direction away from the second position through a certain distance, the push body 44 is stopped by the stopper body 45 and retracted into the main body 41 to minimize the capacity of the oil reservoir 42 for containing the lubricating oil. Under such circumstance, the lubricating oil is driven out of the openings 431 to fill into the spaces in which the rolling sections 33 are received for lubricating the rolling sections 33 and the faces in contact therewith. The amount of the lubricating oil filled into the spaces in which the rolling sections 33 are received is controllably in accordance with the feedback position data of the slider 32. The lubricating oil reserved in the oil reservoir 42 can be totally driven out at one time or driven out stage by stage. The feedback position of the slider 32 after last use will be the start position of the next use. Accordingly, the lubricating section 40 can continuously perform lubrication operation.

It should be noted that the self-lubricating mechanism 10 of the slide member of the present invention is drivable by means of the linear motor's own power for filling the lubricating oil into the spaces. In comparison with the conventional device, no additional power supply unit is required. The present invention is advantageous in that the self-lubricating mechanism 10 has minified volume, simplified structure and reduced weight and is free from the problem of heat generation. In addition, the self-lubricating mechanism 10 is operable in a vacuum environment. In contrast, the environment of the conventional device must be restored to the atmospheric state for performing lubricating operation. Therefore, the self-lubricating mechanism 10 of the present invention can be more economically operated with energy and time saved.

The above embodiments are only used to illustrate the present invention, not intended to limit the scope thereof. Many modifications of the above embodiments can be made without departing from the spirit of the present invention.

What is claimed is:

1. A self-lubricating mechanism of slide member, comprising:
a slide assembly including a linear guide section and a slider slidably mounted on the guide section and linearly reciprocally movable along the guide section between a first position and a second position, the slide assembly further including at least one rolling section held between the slider and the guide section and received in a space defined between the slider and the guide section; and
a lubricating section having a main body fixedly disposed at one end of the slider, the main body having a first side and a second side, the first side of the main body being connected with the end of the slider, an oil reservoir being formed in the main body for containing a lubricating oil therein, the self-lubricating mechanism being characterized in that the lubricating section further has at least one passage formed in the main body in communication with the oil reservoir, the at least one passage having an opening on the first side of the main body in communication with the space in which the at least one rolling section is received;
a push body slidably disposed on the main body, a first end of the push body extending into the oil reservoir, a second end of the push body outwardly extending from the second side of the main body; and
a stopper body fixedly disposed in a position adjacent to the first position and distal from the second position, one side of the stopper body correspondingly facing the second end of the push body, whereby when the slider is displaced to the first position, the second end of the push body abuts against the side of the stopper body, when lubrication is required, the slider being further moved in a direction away from the second position through a predetermined distance, whereby the push body is stopped by the stopper body and slides relative to the main body, the push body then driving the lubricating oil contained in the oil reservoir out of the opening of the at least one passage to fill the lubricating oil into the space in which the rolling section is received, whereby the at least one rolling section and faces in contact therewith are lubricated with the lubricating oil.

2. The self-lubricating mechanism of the slide member as claimed in claim 1, wherein the push body is linearly slidable in a direction parallel to sliding direction of the slider.

3. The self-lubricating mechanism of the slide member as claimed in claim 2, wherein the stopper body is positioned on an extension line of a sliding direction of the push body.

4. The self-lubricating mechanism of the slide member as claimed in claim 1, wherein the first end of the push body has a cross-sectional shape complementary to a cross-sectional shape of the oil reservoir.

5. The self-lubricating mechanism of the slide member as claimed in claim 1, wherein the at least one rolling section of the slide assembly includes two rolling sections respectively held between two opposite sides of the guide section and corresponding faces of the slider, the two rolling sections being received in two spaces defined between the opposite sides of the guide section and the corresponding faces of the slider.

6. The self-lubricating mechanism of the slide member as claimed in claim 5, wherein the at least one passage of the main body of the lubricating section includes two passages, each of the passages having an opening on the first side of the main body, the openings of the passages respectively communicating with the spaces in which the rolling sections are received.

7. The self-lubricating mechanism of the slide member as claimed in claim 1, wherein the end of the slider to which the main body of the lubrication section is fixedly disposed faces the first position.

8. The self-lubricating mechanism of the slide member as claimed in claim 1, further comprising a base seat, the guide section and the stopper body being fixedly disposed on the base seat.

* * * * *